US012674777B2

(12) United States Patent
Matsuyama et al.

(10) Patent No.: US 12,674,777 B2
(45) Date of Patent: Jul. 7, 2026

(54) GAS SENSOR

(71) Applicant: Niterra Co., Ltd., Nagoya (JP)

(72) Inventors: Daisuke Matsuyama, Nagoya (JP);
Kunihiko Yonezu, Nagoya (JP);
Masashi Nomura, Nagoya (JP); **Yuto
Inose**, Nagoya (JP)

(73) Assignee: Niterra Co., Ltd., Nagoya (JP)

( * ) Notice: Subject to any disclaimer, the term of this
patent is extended or adjusted under 35
U.S.C. 154(b) by 192 days.

(21) Appl. No.: 18/698,237

(22) PCT Filed: Jun. 16, 2022

(86) PCT No.: PCT/JP2022/024090
§ 371 (c)(1),
(2) Date: Apr. 3, 2024

(87) PCT Pub. No.: WO2023/074043
PCT Pub. Date: May 4, 2023

(65) Prior Publication Data
US 2025/0231138 A1    Jul. 17, 2025

(30) Foreign Application Priority Data

Oct. 25, 2021    (JP) ................................. 2021-173693

(51) Int. Cl.
*G01N 27/406* (2006.01)
*G01N 27/407* (2006.01)

(52) U.S. Cl.
CPC ..... *G01N 27/4077* (2013.01); *G01N 27/4062* (2013.01)

(58) Field of Classification Search
CPC ........... G01N 27/4077; G01N 27/4062; H01R
4/183–186; H01R 4/20; H01R 4/26;
H01R 4/48
See application file for complete search history.

(56) References Cited

U.S. PATENT DOCUMENTS

| | | | | |
|---|---|---|---|---|
| 5,766,025 A | * | 6/1998 | Davis | H01R 24/62 |
| | | | | 439/660 |
| 2013/0205872 A1 | * | 8/2013 | Katou | G01N 33/0009 |
| | | | | 73/31.07 |

(Continued)

FOREIGN PATENT DOCUMENTS

| | | |
|---|---|---|
| CN | 105467075 A | 4/2016 |
| JP | S61-70763 U | 5/1986 |

(Continued)

OTHER PUBLICATIONS

EPO machine-generated English language translation of CN 105467075
A , patent published Apr. 6, 2016 (Year: 2016).*

(Continued)

*Primary Examiner* — Alexander S Noguerola
(74) *Attorney, Agent, or Firm* — Sughrue Mion, PLLC

(57) ABSTRACT

A gas sensor 200 including: a sensor element 10; and a
separator 166 storing a metal terminal 21 inside a passage
hole 166h, wherein the metal terminal has a body portion
21a having a main surface 21m, a first engagement portion
21d, and a second engagement portion 21e, the separator
further has a ledge portion 166a having a first rearward-
facing surface 312 and a first frontward-facing surface 314,
a front-end side of the first engagement portion protrudes/
sinks outward/inward of the main surface, and the front end
is opposed to the first rearward-facing surface, and in the
main-surface direction, a maximum opening width W2 of
each retention hole 166hs retaining the metal terminal one
by one satisfies a relationship of W2<W1 with respect to a
maximum width W1 of the metal terminal at a part where the
second engagement portion is located.

4 Claims, 8 Drawing Sheets

(56) References Cited

U.S. PATENT DOCUMENTS

| | | | | |
|---|---|---|---|---|
| 2016/0209351 A1* | 7/2016 | Oba | .................. | G01N 27/4062 |
| 2018/0011047 A1* | 1/2018 | Oba | ...................... | H01R 13/42 |

FOREIGN PATENT DOCUMENTS

| | | | |
|---|---|---|---|
| JP | H02-144762 | U | 12/1990 |
| JP | 2002-323475 | A | 11/2002 |
| JP | 2011-047842 | A | 3/2011 |
| JP | 2016-130725 | A | 7/2016 |
| JP | 2018-013475 | A | 1/2018 |
| JP | 2018-132407 | A | 8/2018 |

OTHER PUBLICATIONS

EPO machine-generated English language translation of JP 2016-130725 A , patent published Jul. 21, 2016 (Year: 2016).*
EPO machine-generated English language translation of JP 2018-13475 A, patent published Jan. 25, 2016 (Year: 2016).*
International Search Report for PCT/JP2022/024090 dated Aug. 23, 2022 (PCT/ISA/210).
Communication dated Jun. 10, 2025 issued by the Japanese Patent Office in application No. 2021-173693.

* cited by examiner

[FIG.1]
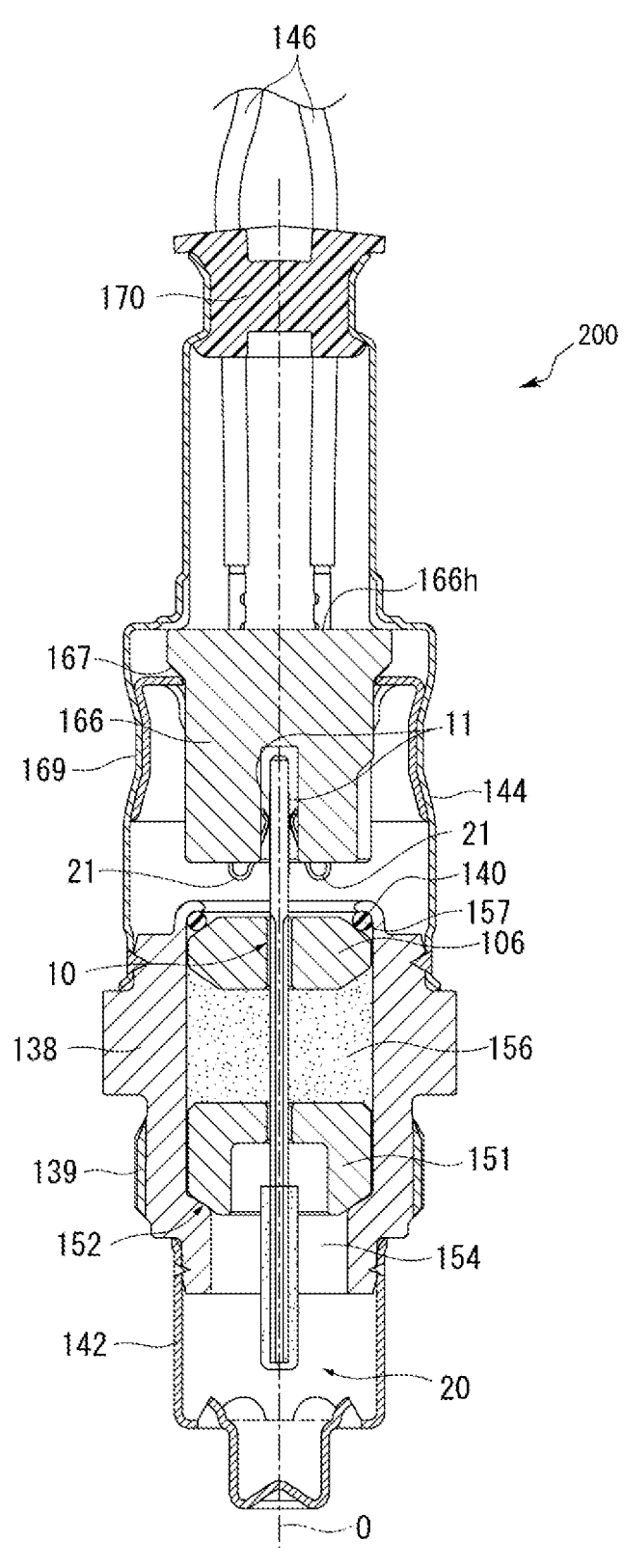

[FIG.2]
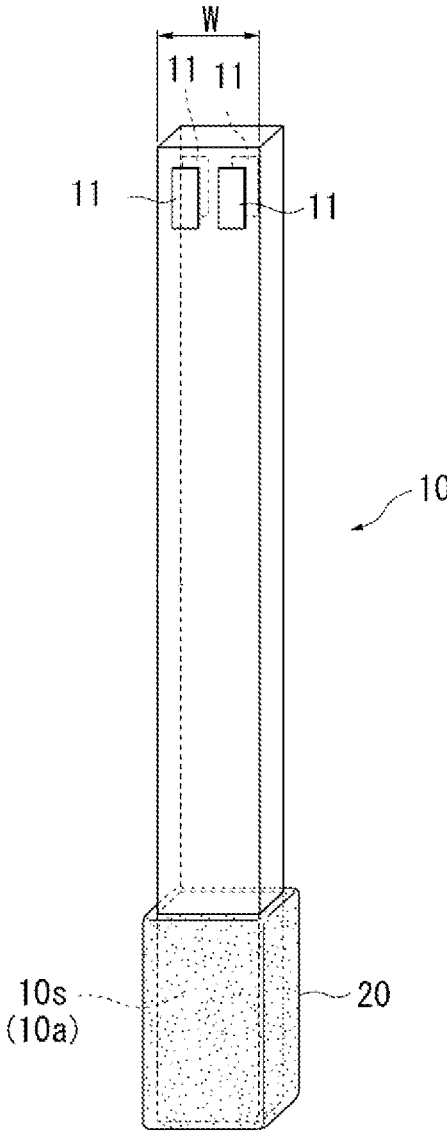

[FIG.3]
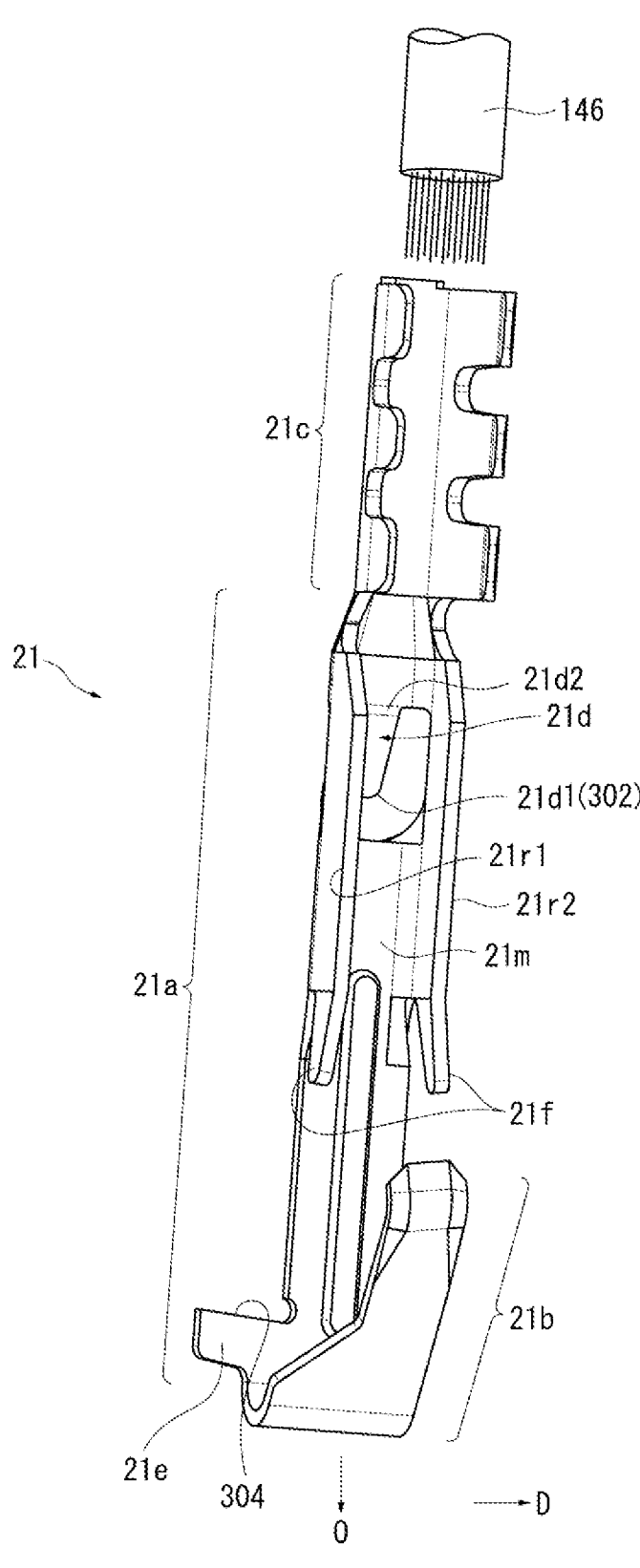

[FIG.4]
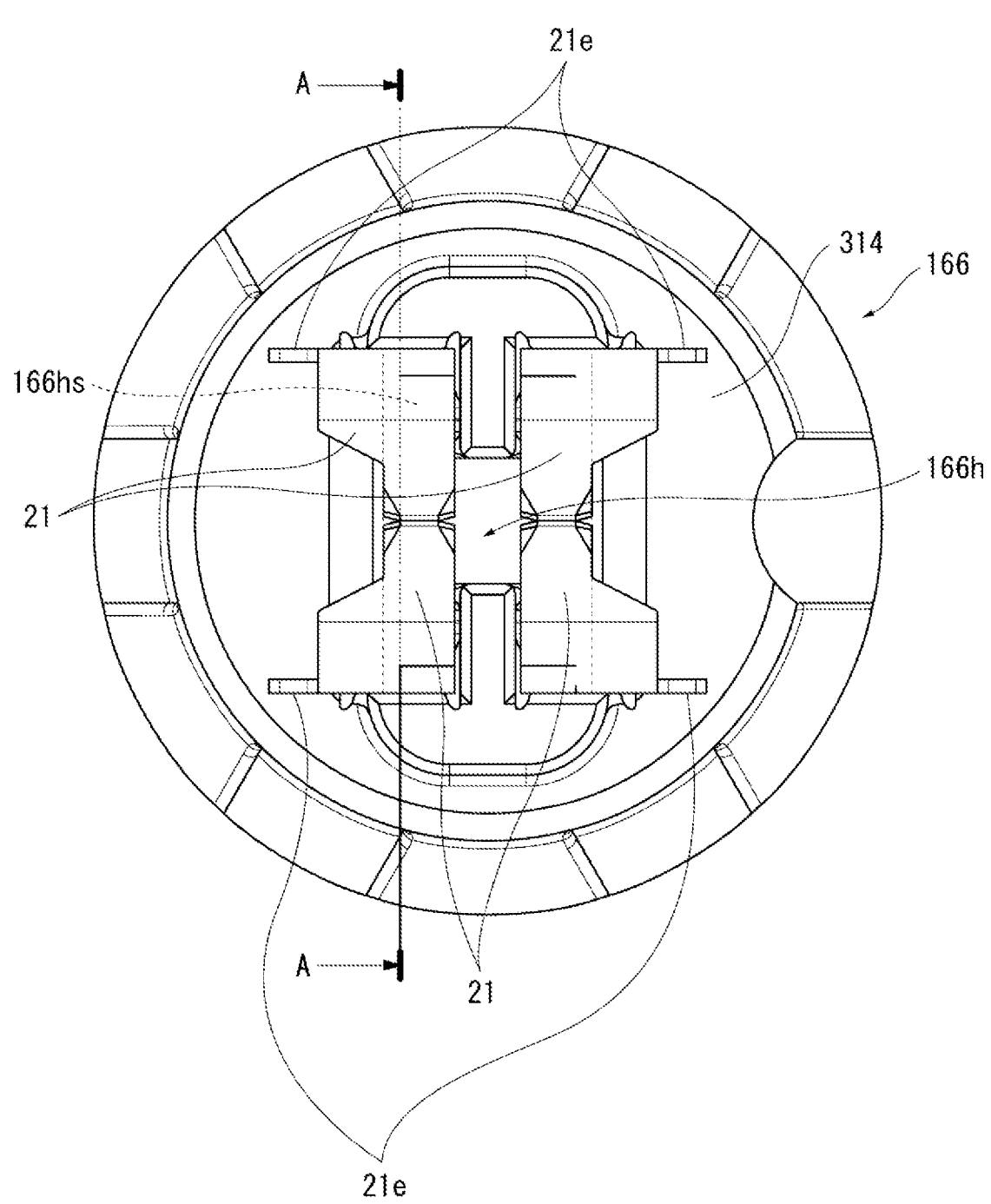

[FIG.5]
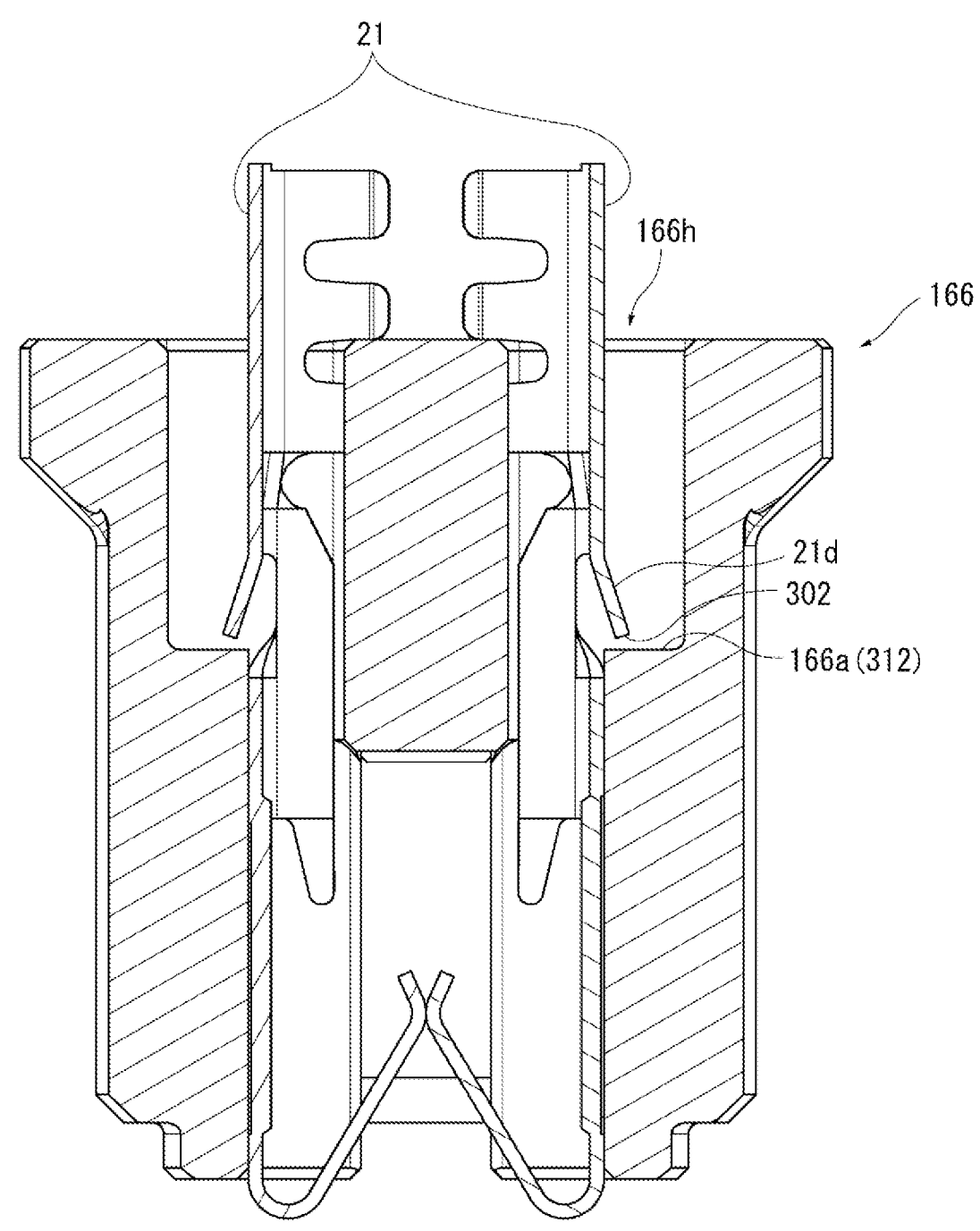

[FIG.6]
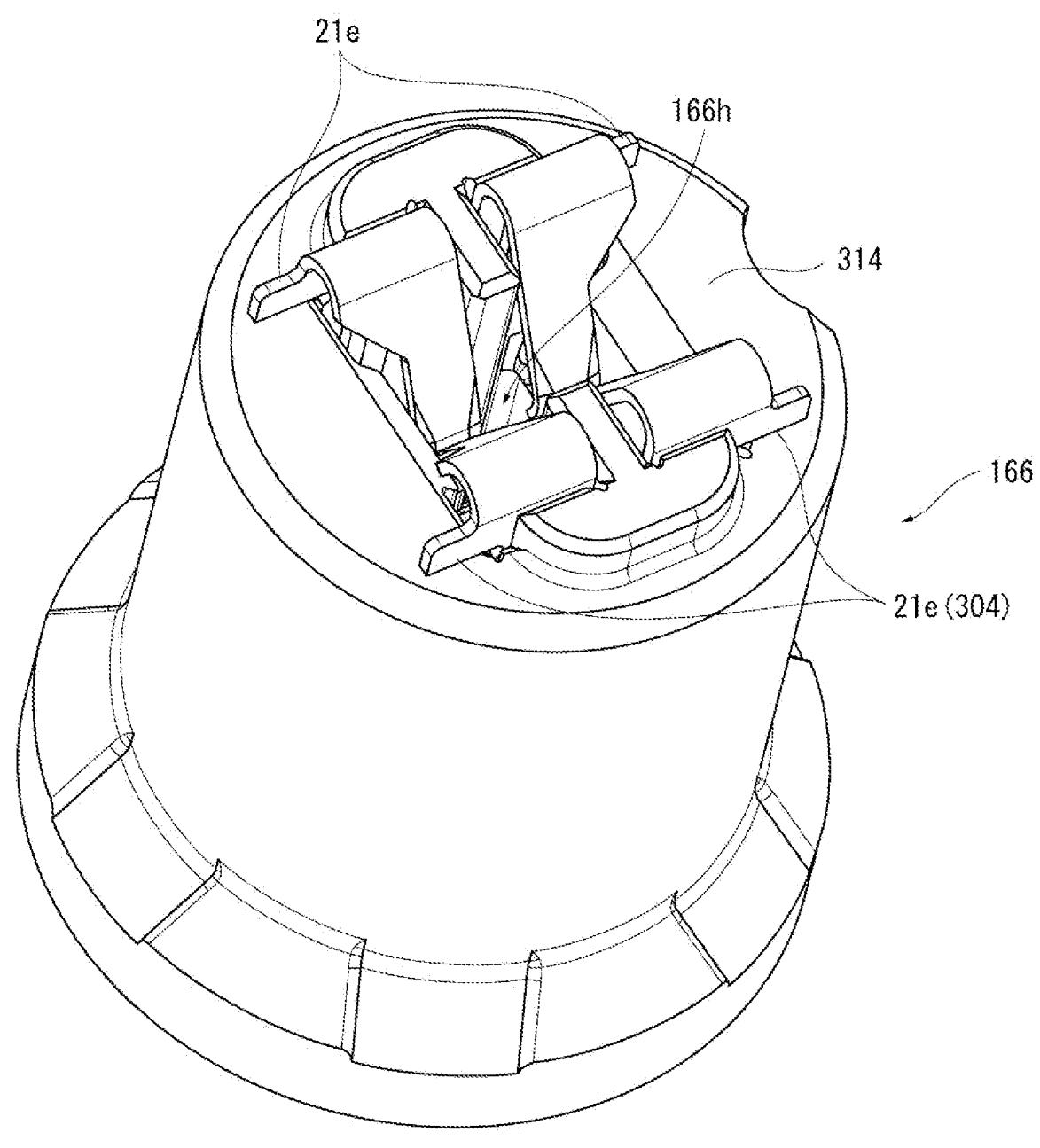

[FIG.7]
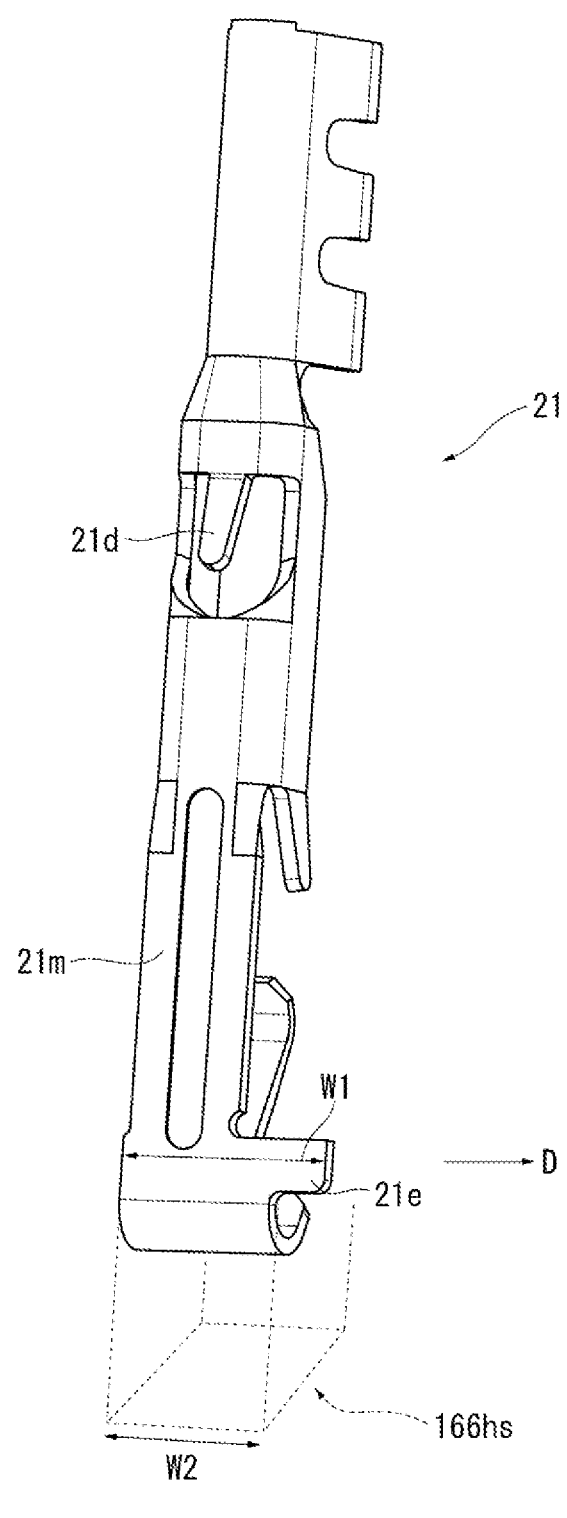

[FIG.8]
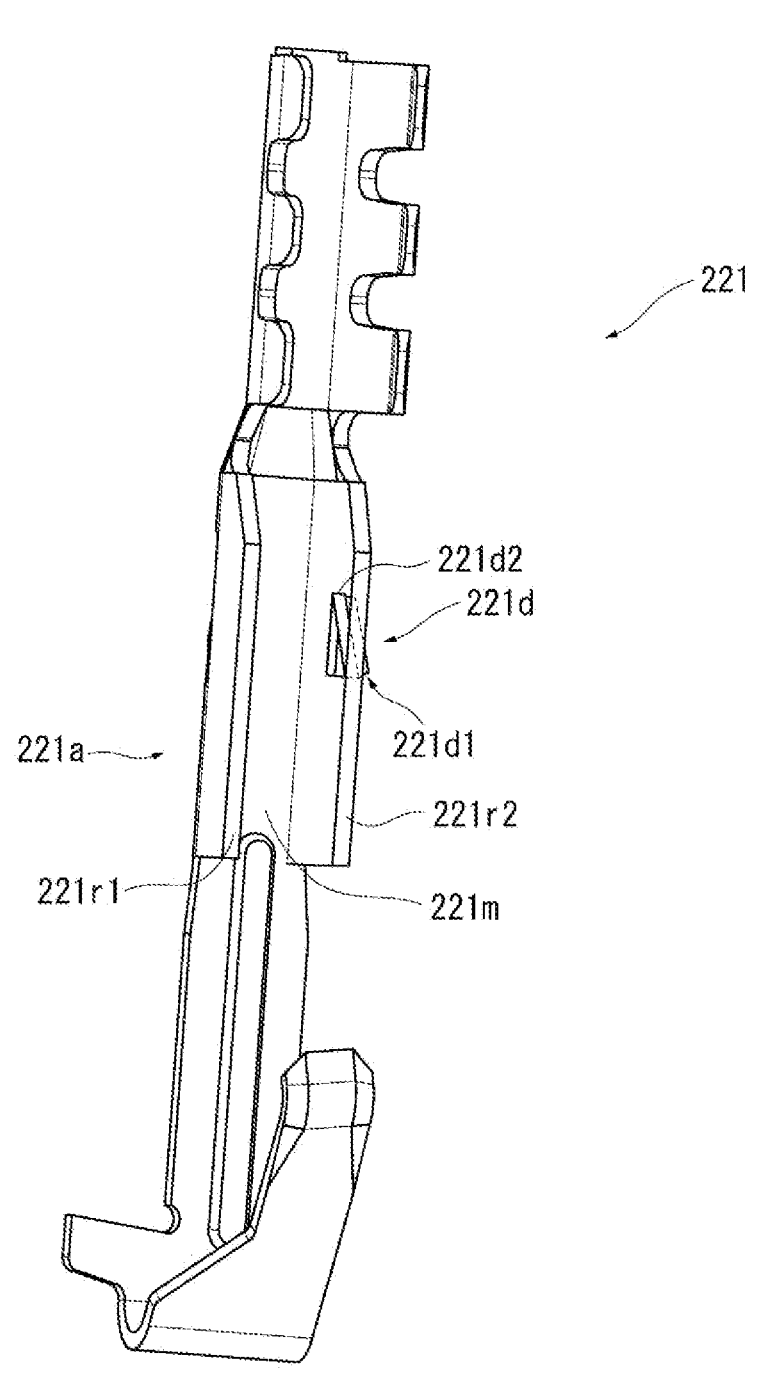

GAS SENSOR

CROSS REFERENCE TO RELATED APPLICATIONS

This application is a National Stage of International Application No. PCT/JP2022/024090 filed Jun. 16, 2022, claiming priority based on Japanese Patent Application No. 2021-173693 filed Oct. 25, 2021.

TECHNICAL FIELD

The present invention relates to a gas sensor including a sensor element for detecting the concentration of a detection target gas.

BACKGROUND ART

As a gas sensor for detecting the concentration of oxygen or NOx in exhaust gas of an automobile or the like, a gas sensor having a sensor element using solid electrolytes is known.

In some gas sensors of this type, a plurality of electrode pads are provided at the rear end side of a plate-shaped sensor element, an separator (insulator) is provided so as to surround a radially outer side at the rear end side of the sensor element, and metal terminals are held in the separator (Patent Documents 1 and 2). The metal terminals are electrically connected to the electrode pads, and the rear end sides of the metal terminals are crimped and connected to lead wires so that a sensor output signal from the sensor element is taken to the outside via the lead wires. The lead wires are led to the outside through a rubber grommet provided at the rear side of the gas sensor.

Here, in the gas sensor in Patent Document 1, an engagement portion 21f for preventing coming off is provided at a front end of the metal terminal. Then, when the lead wire led out of the gas sensor is pulled rearward in use of the gas sensor, a second rearward-facing surface 304 of the engagement portion contacts with a frontward-facing surface of the separator, thus preventing the metal terminal from coming off rearward.

In the gas sensor in Patent Document 2, a cut raised portion 121 for preventing coming off is provided near the center in the axial-line direction of the metal terminal. Then, inside a ledge portion provided to a passage hole of the separator, the cut raised portion 121 expands in diameter in the radial direction to contact with the ledge portion, thus preventing the metal terminal from coming off frontward.

PRIOR ART DOCUMENT

Patent Document

Patent Document 1: Japanese Patent Application Laid-Open (kokai) No. 2018-132407 (FIG. 3, FIG. 7)

Patent Document 2: Chinese Patent Publication No. CN105467075 (FIG. 12, FIG. 13)

SUMMARY OF THE INVENTION

Problem to be Solved by the Invention

However, in the gas sensors in Patent Documents 1 and 2, it is difficult to assuredly prevent the metal terminal from both coming off frontward and coming off rearward. For example, in the gas sensor in Patent Document 2, the metal terminal is likely to come off rearward.

On the other hand, in the gas sensor in Patent Document 1, the metal terminal is inserted from the rear-end side of the separator. Therefore, the engagement portion 21f is bent (deflected) in the radial direction and passed through a slit of the passage hole of the separator. Then, when the engagement portion 21f is passed over the slit of the separator, the engagement portion 21f elastically returns so that a plate surface faces obliquely relative to the passage hole of the separator.

However, if the engagement portion 21f is excessively bent, the engagement portion 21f is plastically deformed. Therefore, the bending amount and also the return amount of the engagement portion 21f cannot be set to be large, and the engagement portion 21f comes close to the slit. Thus, when the metal terminal is displaced, the engagement portion 21f might enter the slit and drop, ending up coming off rearward.

Then, when the metal terminal comes off frontward or rearward from the separator, contacts of the metal terminal and the electrode pad shift from each other, resulting in reduction in reliability of electric connection.

Accordingly, an object of the present invention is to provide such a gas sensor that a metal terminal is assuredly prevented from coming off frontward and coming off rearward, thus improving reliability of electric connection between the metal terminal and an electrode pad.

Means for Solving the Problem

In order to solve the above problem, a gas sensor of the present invention is a gas sensor comprising: a sensor element extending in an axial-line direction, and having a detection portion on a front-end side and an electrode pad at an outer surface on a rear-end side; a metal terminal extending in the axial-line direction and electrically connected to the electrode pad; and a tubular separator having a passage hole extending along the axial-line direction, the separator storing the metal terminal inside the passage hole and surrounding the electrode pad of the sensor element, wherein the metal terminal has a plate-shaped body portion extending in the axial-line direction and supported inside the passage hole, the body portion having a main surface, a first engagement portion connected to the body portion and capable of protruding/sinking outward/inward of the main surface, and a second engagement portion located on the front-end side relative to the first engagement portion and connected to the body portion, the second engagement portion protruding in a main-surface direction of the body portion while being flush with the main surface, the separator further has a ledge portion having a first rearward-facing surface contiguously to the passage hole, and a first frontward-facing surface formed on the front-end side relative to the first rearward-facing surface contiguously to the passage hole, the first engagement portion is formed such that a rear-end side is connected to the body portion, a front-end side protrudes/sinks outward/inward of the main surface without being constrained, and the front end is opposed to the first rearward-facing surface, and in the main-surface direction, regarding the passage hole, a maximum opening width W2 of each retention hole retaining the metal terminal one by one satisfies a relationship of $W2<W1$ with respect to a maximum width $W1$ of the metal terminal at a part where the second engagement portion is located.

With this gas sensor, the front-end side of the first engagement portion is not constrained and therefore is pushed by a wall surface of the passage hole so as to retract inward of the main surface, whereby the metal terminal can be passed from the front-end side of the separator. Thus, the second engagement portion can be connected to be flush with the main surface of the body portion, and the second engagement portion need not be deflected in the radial direction as in a case of inserting the metal terminal from the rear-end side of the separator, for example.

Thus, such a phenomenon that the second engagement portion is excessively deflected to be elastically deformed so that the maximum width W1 is reduced, does not occur, the relationship of W2<W1 can be assuredly satisfied, and the metal terminal can be assuredly prevented from coming off rearward. Then, even if the metal terminal is displaced in the main-surface direction inside the retention hole, the second engagement portion is prevented from dropping from the first frontward-facing surface 314 of the separator and entering the retention hole, whereby the metal terminal can be assuredly prevented from coming off rearward.

Further, the front end side of the first engagement portion turns as a free end around the rear end side so as to protrude/sink outward/inward of the main surface, whereby the movement amount (turning amount) on the front end side can be set to be large and therefore the amount of outward protrusion from the main surface of the first engagement portion in the space around the ledge portion can be increased. Thus, even if the metal terminal is displaced inside the separator, the first engagement portion can be prevented from dropping from the ledge portion and coming off frontward.

The gas sensor of the present invention may comprise a plurality of the metal terminals, wherein as seen in a cross-section perpendicular to the axial-line direction, the first engagement portions of two of the metal terminals that are opposed to each other across the sensor element may protrude outward in a radial direction.

With this gas sensor, unlike a case where the first engagement portions protrude inward in the radial direction, the first engagement portions protrude away from each other toward opposite sides in the radial direction across the sensor element. Thus, the first engagement portions 21d or the crimp terminal portions 21c of the metal terminal 21 can be prevented from contacting with each other.

The gas sensor of the present invention may comprise a plurality of the metal terminals, wherein each second engagement portion may be formed at, of the body portion, only one end in a width direction outward in a radial direction of the separator.

With this gas sensor, the second engagement portions of the adjacent metal terminals can be prevented from facing and coming close to each other, and thus the second engagement portions can be prevented from contacting and being short-circuited with each other.

Advantageous Effects of the Invention

The present invention can provide a gas sensor that a metal terminal is assuredly prevented from coming off frontward and coming off rearward, thus improving reliability of electric connection between the metal terminal and an electrode pad.

BRIEF DESCRIPTION OF THE DRAWINGS

FIG. 1 Sectional view along a longitudinal direction of a gas sensor according to an embodiment of the present invention.

FIG. 2 Perspective view of a sensor element.

FIG. 3 Perspective view of a metal terminal.

FIG. 4 Bottom view of a separator as seen from the front side.

FIG. 5 Sectional view in the axial-line direction of the separator taken along line A-A in FIG. 4.

FIG. 6 Perspective bottom view of the separator as seen from the front side.

FIG. 7 View showing the widths of parts of a retention hole and the metal terminal.

FIG. 8 Perspective view of a metal terminal in a modification.

MODES FOR CARRYING OUT THE INVENTION

Hereinafter, an embodiment of the present invention will be described.

FIG. 1 is an entire sectional view along a longitudinal direction of a gas sensor (oxygen sensor) 200 according to the embodiment of the present invention. FIG. 2 is a perspective view of a sensor element 10. FIG. 3 is a perspective view of a metal terminal 21. FIG. 4 is a bottom view of a separator as seen from the front side.

The gas sensor 200 is an oxygen sensor for detecting the concentration of oxygen in exhaust gas of an automobile or various internal combustion engines.

In FIG. 1, the gas sensor 200 includes: a cylindrical metal shell 138 having, on the outer circumferential surface thereof, a screw portion 139 for fixation to an exhaust pipe; the sensor element 10 having a plate shape extending in the direction of an axial line O (the longitudinal direction of the gas sensor 200, i.e., up-down direction in FIG. 1); a tubular ceramic sleeve 106 provided so as to surround the radial-direction periphery of the sensor element 10; a tubular separator 166 made of ceramic and provided in a state of surrounding the periphery of a rear end of the sensor element 10 inside the front-end side of a passage hole 166h penetrating in the axial-line direction, and four metal terminals 21 (only two of them are shown in FIG. 1) provided between the sensor element 10 and the separator 166.

A gas detection portion 10a at a front end of the sensor element 10 is covered with a porous protection layer 20 of alumina or the like.

The metal shell 138 is made of stainless steel, has a through hole 154 penetrating in the axial-line direction, and is formed substantially in a tubular shape having a ledge portion 152 protruding radially inward of the through hole 154. In the through hole 154, the sensor element 10 is placed such that a front end portion of the sensor element 10 protrudes frontward relative to the front end of the through hole 154. The ledge portion 152 is formed as an inward taper surface sloped relative to a plane perpendicular to the axial-line direction.

Inside the through hole 154 of the metal shell 138, an annular ceramic holder 151 made of alumina, a powder filled layer 156 (hereinafter, may be referred to as talc ring 156), and the aforementioned ceramic sleeve 106 are stacked in this order from the front side to the rear side so as to surround the radial-direction periphery of the sensor element 10.

A crimp packing 157 is provided between the ceramic sleeve 106 and a rear end portion 140 of the metal shell 138. The rear end portion 140 of the metal shell 138 is crimped so as to press the ceramic sleeve 106 toward the front side via the crimp packing 157.

On the other hand, as shown in FIG. 1, around the outer periphery at the front side (downward side in FIG. 1) of the metal shell 138, a protector 142 as a single-layer protector having a plurality of holes and made of metal (e.g., stainless steel) are attached by welding or the like so as to cover a protruding part of the sensor element 10.

An outer casing 144 is fixed to the outer periphery at the rear side of the metal shell 138. At an opening on the rear side (upward side in FIG. 1) of the outer casing 144, a grommet 170 made of rubber is provided, and four lead wires 146 (only two of them are shown in FIG. 1) electrically connected to the four metal terminals 21 (only two of them are shown in FIG. 1) of the sensor element 10 pass through lead wire passage holes (not shown) formed in the grommet 170.

The grommet 170 is crimped from the outer side of the outer casing 144 so that the grommet 170 is retained inside the outer casing 144.

The separator 166 is provided at the rear end side (upward side in FIG. 1) of the sensor element 10 protruding from the rear end portion 140 of the metal shell 138. The separator 166 is provided around a total of four electrode pads 11 (only two of them are shown in FIG. 1) formed on main surfaces at the rear end side of the sensor element 10. The separator 166 is formed in a tubular shape having a passage hole 166h penetrating in the axial-line direction, and has a flange portion 167 protruding radially outward from the outer surface. The separator 166 is held inside the outer casing 144 by the flange portion 167 contacting with the outer casing 144 via a holding member 169.

As shown in FIG. 2, the sensor element 10 has a plate shape extending in the direction of the axial line O, and a front end portion 10s thereof serves as a gas detection portion 10a for detecting the concentration of oxygen. The gas detection portion 10a is covered with the porous protection layer 20. The sensor element 10 itself has a known configuration, i.e., although not shown, has a gas detection portion having an oxygen-ion-permeable solid electrolyte and a pair of electrodes, and a heater portion for heating the gas detection portion to keep the temperature thereof constant.

At a rear end side on one main surface of the sensor element 10, two electrode pads 11 are arranged in the direction of a width W, and a sensor output signal from the gas detection portion 10a is outputted from the electrode pads 11 via a lead portion (not shown). In addition, at the rear end side on another main surface opposite to the main surface, two electrode pads 11 are arranged in the direction of the width W, whereby power is supplied to the heater portion via a lead portion (not shown).

Each electrode pad 11 has a rectangular shape long in the axial-line-O direction, and can be formed as a sintered body mainly composed of Pt, for example.

FIG. 3 is a perspective view of the metal terminal 21. In the present embodiment, as described later, the gas sensor 200 has four metal terminals 21, and as shown in FIG. 4, the four metal terminals 21 are arranged at positions corresponding to vertices of a rectangular shape in the separator 166, the adjacent metal terminals 21 are line-symmetric with each other, and the metal terminals 21 on a diagonal line have the same shape. That is, there are two kinds which are the metal terminal 21 in FIG. 3 and a metal terminal line-symmetric therewith and located at the right of FIG. 3 (corresponding to the metal terminal 21 on the right side in FIG. 4). These metal terminals have substantially the same constituent parts, and therefore only the metal terminal 21 in FIG. 3 will be described.

As shown in FIG. 3, the metal terminal 21 has, integrally, a plate-shaped body portion 21a having substantially a plate shape and extending in the axial-line-O direction, a front-end portion 21b folded rearward from a front edge of the body portion 21a, a crimp terminal portion 21c connected to a rear end of the body portion 21a, a first engagement portion 21d, and a second engagement portion 21e located on the front-end side relative to the first engagement portion 21d.

In this example, the body portion 21a has a main surface 21m which is a folded surface with respect to the front-end portion 21b, and a pair of ribs 21r1, 21r2 bent in L shapes from both ends in the width direction of the main surface 21m toward the front-end portion 21b. Thus, a cross-section of the body portion 21a as seen in a radial direction D crossing the axial-line-O direction has a U shape. The front ends of the ribs 21r1, 21r2 elastically expand outward in the width direction, to form a pair of pressing portions 21f.

However, the ribs 21r1, 21r2 and the pressing portions 21f may not necessarily be provided. The main surface 21m is a folded surface with respect to the front-end portion 21b.

Here, the first engagement portion 21d is cut and raised from the main surface 21m of the body portion 21a toward a side opposite to the front-end portion 21b, and a rear end 21d2 side thereof is connected to the body portion 21a. A front end 21d1 side of the first engagement portion 21d is a free end not constrained and can elastically deflect so as to turn around the rear end 21d2 side.

Thus, the first engagement portion 21d can deflect in the radial direction D and protrude outward in the radial direction D (toward the side opposite to the front-end portion 21b) from the main surface 21m. More specifically, under no load, the first engagement portion 21d protrudes outward in the radial direction D, and when passing inside the passage hole 166h of the separator 166, the first engagement portion 21d is pushed by an inner wall of the separator 166 and elastically deflects inward in the radial direction D, thus retracting to be almost flush with the main surface 21m.

A second frontward-facing surface 302 is formed at the front end 21d1 of the first engagement portion 21d.

The second engagement portion 21e is connected to the body portion 21a, and extends so as to protrude in a main-surface direction D (direction along the main surface 21m; the same direction as the radial direction in this example) from one end (left side in FIG. 3) in the width direction of the body portion 21a, while being flush with main surface 21m.

A second rearward-facing surface 304 is formed at the second engagement portion 21e.

The crimp terminal portion 21c has a known tubular shape, and the lead wire 146 with its coating removed so as to expose conductive wires is inserted into the tubular crimp terminal portion 21c, which is then crimped, so that the lead wire 146 is electrically connected.

The front edge of the front-end portion 21b is folded rearward to form a free end. Then, the front-end portion 21b is pressed to the electrode pad 11 side owing to spring property (elasticity) of the metal terminal 21, thereby obtaining assured electric connection between the electrode pad 11 and the metal terminal 21.

The metal terminal 21 can be manufactured by stamping one metal plate (INCONEL (registered trademark), etc.), and then bending the front-end portion 21b, etc., for example. However, the manufacturing method is not limited thereto.

FIG. 5 is a sectional view in the axial-line-O direction of the separator 166 taken along line A-A in FIG. 4, and FIG. 6 is a perspective bottom view of the separator 166 as seen from the front-end side.

As shown in FIG. 4, the passage hole 166*h* having a rectangular shape penetrates in the axial-line direction at the center of the separator 166. On the radial-direction outer sides of vertices of the rectangular shape of the passage hole 166*h*, four retention holes 166*hs* that have rectangular shapes and each retain the metal terminal 21 one by one are formed contiguously to the passage hole 166*h* integrally, so that the passage hole 166*h* is formed in substantially an H shape in its entirety as seen in the axial-line-O direction. The four metal terminals 21 are respectively inserted into the retention hole 166*hs* parts located at the vertices of the rectangular shape of the passage hole 166*h*.

As shown in FIG. 5, the separator 166 has a ledge portion 166*a* having a first rearward-facing surface 312 contiguously to the passage hole 166*h*.

As shown in FIG. 6, the separator 166 has a first frontward-facing surface 314 contiguously to the passage hole 166*h*.

Next, a configuration in which the metal terminals 21 are arranged in the separator 166 will be described. In this example, each metal terminal 21 to which the lead wire 146 is connected in advance is passed into the passage hole 166*h* from the front-end side of the separator 166.

At this time, the front end 21*d*1 side of the first engagement portion 21*d* is pushed by a wall surface of the above retention hole 166*hs* so as to protrude/sink outward/inward of the main surface 21*m* and elastically deflect inward in the radial direction D, so that the first engagement portion 21*d* retracts to be almost flush with the main surface 21*m* and therefore the insertion can be prevented from being obstructed. In this example, the front end 21*d*1 side of the first engagement portion 21*d* sinks inward of the main surface 21*m* by elastically deflecting inward in the radial direction D.

Then, as shown in FIG. 5, when the metal terminal 21 is passed into the passage hole 166*h* to a predetermined insertion depth, the front end 21*d*1 of the first engagement portion 21*d* reaches a space around the ledge portion 166*a*, so that the first engagement portion 21*d* comes into a no-load state and protrudes outward in the radial direction D (outward of the main surface 21*m*).

Therefore, when the metal terminal 21 is pulled frontward to come off, the second frontward-facing surface 302 of the first engagement portion 21*d* contacts with the first rearward-facing surface 312 of the separator 166, thus preventing the metal terminal 21 from coming off frontward.

The rear end 21*d*2 side of the first engagement portion 21*d* is connected to the body portion 21*a* and the front end 21*d*1 side thereof elastically deflects as a free end. Therefore, this can be applied to the configuration in which the metal terminal 21 is inserted from the front-end side of the separator 166, and accordingly, the metal terminal 21 can be assuredly prevented from coming off rearward, by the second engagement portion 21*e* described later.

Further, the front end 21*d*1 side of the first engagement portion 21*d* turns as a free end around the rear end 21*d*2 side so as to protrude/sink outward/inward of the main surface 21*m*, whereby the movement amount (turning amount) on the front end 21*d*1 side can be set to be large and therefore the amount of outward protrusion from the main surface 21*m* of the first engagement portion 21*d* in the space around the ledge portion 166*a* can be increased. Thus, even if the metal terminal 21 is displaced inside the separator 166, the first engagement portion 21*d* can be prevented from dropping from the ledge portion 166*a* and coming off frontward.

As shown in FIG. 6, when the metal terminal 21 is passed into the passage hole 166*h* to the predetermined insertion depth, the second engagement portion 21*e* cannot pass through the above retention hole 166*hs* and is caught on the first frontward-facing surface 314 of the separator 166.

Therefore, when the metal terminal 21 is pulled rearward to come off, the second rearward-facing surface 304 of the second engagement portion 21*e* contacts with the first frontward-facing surface 314 of the separator 166, thus preventing the metal terminal 21 from coming off rearward.

In this example, the pair of pressing portions 21*f* elastically expand outward in the width direction inside the above retention hole 166*hs*, to contact with the hole wall surface, whereby the metal terminal 21 can be prevented from being displaced inside the retention hole 166*hs*.

Here, as shown in FIG. 7, in the main-surface direction D, a maximum opening width W2 of the retention hole 166*hs* satisfies a relationship of W2<W1 with respect to a maximum width W1 of the metal terminal 21 at a part where the second engagement portion 21*e* is located.

Thus, even if the metal terminal 21 is displaced in the main-surface direction D inside the retention hole 166*hs*, the second engagement portion 21*e* is prevented from dropping from the first frontward-facing surface 314 of the separator 166 and entering the retention hole 166*hs*, whereby the metal terminal 21 can be assuredly prevented from coming off rearward.

Since this can be applied to the configuration in which the metal terminal 21 is inserted from the front-end side of the separator 166 as described above, the second engagement portion 21*e* can be connected to be flush with the main surface 21*m* of the body portion 21*a*. Therefore, the second engagement portion 21*e* need not be deflected in the radial direction as in a case of inserting the metal terminal 21 from the rear-end side of the separator 166. Thus, such a phenomenon that the second engagement portion 21*e* is excessively deflected to be elastically deformed so that the maximum width W1 is reduced, does not occur, the relationship of W2<W1 can be assuredly satisfied, and the metal terminal 21 can be assuredly prevented from coming off rearward.

As described above, by the first engagement portion 21*d* and the second engagement portion 21*e*, the metal terminal 21 is assuredly prevented from coming off frontward and coming off rearward, whereby reliability of electric connection between the metal terminal 21 and the electrode pad 11 can be improved.

As shown in FIG. 6, in this example, a plurality of (four) metal terminals 21 are provided, and each second engagement portion 21*e* is formed at, of the body portion 21, only one end in the width direction outward in the radial direction of the separator 166.

With this structure, the second engagement portions 21*e* of the adjacent metal terminals 21 can be prevented from facing and coming close to each other, and thus the second engagement portions 21*e* can be prevented from contacting and being short-circuited with each other.

Needless to say, the present invention is not limited to the above embodiment and includes various modifications and equivalents encompassed in the idea and the scope of the present invention.

For example, the shapes, the number, and the like of the metal terminals are not limited to those in the above embodiment. Also, the shape of the separator, the shapes of the passage hole and the ledge portion of the separator, the numbers thereof, and the like are not limited to those in the above embodiment.

For example, as shown in FIG. 8, a first engagement portion 221*d* may be cut and raised from a rib 221*r*2 of a body portion 221*a* without being cut and raised from a main surface 221*m* of the body portion 221*a*. In this case, a rear end 221*d*2 side of the first engagement portion 221*d* is connected to the rib 221*r*2 of the body portion 21*a*, and a front end 221*d*1 side thereof can elastically deflect as a free end.

Thus, the first engagement portion 221*d* can deflect in the radial direction D and protrude outward in the radial direction D (in parallel to the main surface 221*m*) from the rib 221*r*2 of the body portion 21*a*.

In this example, a plurality of (four) metal terminals 21 are provided, and as seen in the cross-section (along the radial direction) perpendicular to the axial-line direction, the first engagement portions 21*d* of two metal terminals 21 opposed to each other across the sensor element 10 protrude outward in the radial direction, as shown in FIG. 5.

If the first engagement portions 21*d* of the two metal terminals 21 opposed to each other across the sensor element 10 protrude inward in the radial direction, it is necessary to, on the radial-direction center side of the separator 166, provide a space and form a step portion for engaging the first engagement portion 21*d* therewith. However, in this case, there is a possibility that the first engagement portions 21*d* or the crimp terminal portions 21*c* of the metal terminal 21 contact with each other.

Accordingly, when the first engagement portions 21*d* of the metal terminals 21 protrude outward in the radial direction, the above interference can be prevented.

Examples of types of the gas sensor include, besides an oxygen sensor, a full-range air/fuel ratio sensor and a NOx sensor.

DESCRIPTION OF REFERENCE NUMERALS

10 sensor element
10*a* gas detection portion
11 electrode pad
21,22 metal terminal
21*a*, 221*a* body portion
21*m*, 221*m* main surface
21*d*, 221*d* first engagement portion
21*d*1 front end side of the first engagement portion
21*d*2 rear end side of the first engagement portion
21*e* second engagement portion
166 . . . separator
166*a* ledge portion
166*h* passage hole
166*hs* retention hole
200 gas sensor
312 first rearward-facing surface
314 first frontward-facing surface
302 second frontward-facing surface
304 second rearward-facing surface
O axial-line
D radial direction (in parallel to the main surface)

The invention claimed is:

1. A gas sensor comprising:
a sensor element extending in an axial-line direction, and having a detection portion on a front-end side and an electrode pad at an outer surface on a rear-end side;
a metal terminal extending in the axial-line direction and electrically connected to the electrode pad; and
a tubular separator having a passage hole extending along the axial-line direction, the separator storing the metal terminal inside the passage hole and surrounding the electrode pad of the sensor element, wherein
the metal terminal has
a plate-shaped body portion extending in the axial-line direction and supported inside the passage hole, the body portion having a main surface,
a first engagement portion, which is a cut-and-raised cantilever tab formed from the main surface of the body portion, capable of protruding/sinking outward/inward from the main surface, and
a second engagement portion located on the front-end side relative to the first engagement portion and connected to the body portion, the second engagement portion protruding in a main-surface direction of the body portion while being flush with the main surface,
the separator further has a ledge portion having a first rearward-facing surface contiguously to the passage hole, and a first frontward-facing surface formed on the front-end side relative to the first rearward-facing surface contiguously to the passage hole,
the first engagement portion is formed such that a rear-end side of the cut-and-raised cantilever tab is connected to the body portion, a front-end side of the cut-and-raised cantilever tab is an unconstrained tip that is free to protrude/sink outward/inward of the main surface, and the front end is opposed to the first rearward-facing surface, and
in the main-surface direction, regarding the passage hole, a maximum opening width W2 of each retention hole retaining the metal terminal one by one satisfies a relationship of W2<W1 with respect to a maximum width W1 of the metal terminal at a part where the second engagement portion is located.

2. The gas sensor according to claim 1, comprising a plurality of the metal terminals, wherein
as seen in a cross-section perpendicular to the axial-line direction, the first engagement portions of two of the metal terminals that are opposed to each other across the sensor element protrude outward in a radial direction.

3. The gas sensor according to claim 1, comprising a plurality of the metal terminals, wherein
each second engagement portion is formed at, of the body portion, only one end in a width direction outward in a radial direction of the separator.

4. The gas sensor according to claim 1, wherein the front-end side of the cut-and-raised cantilever tab elastically deflects inward during insertion and then protrudes outward in the ledge portion to oppose the first rearward-facing surface and prevent frontward removal.

\* \* \* \* \*